Figure 1:
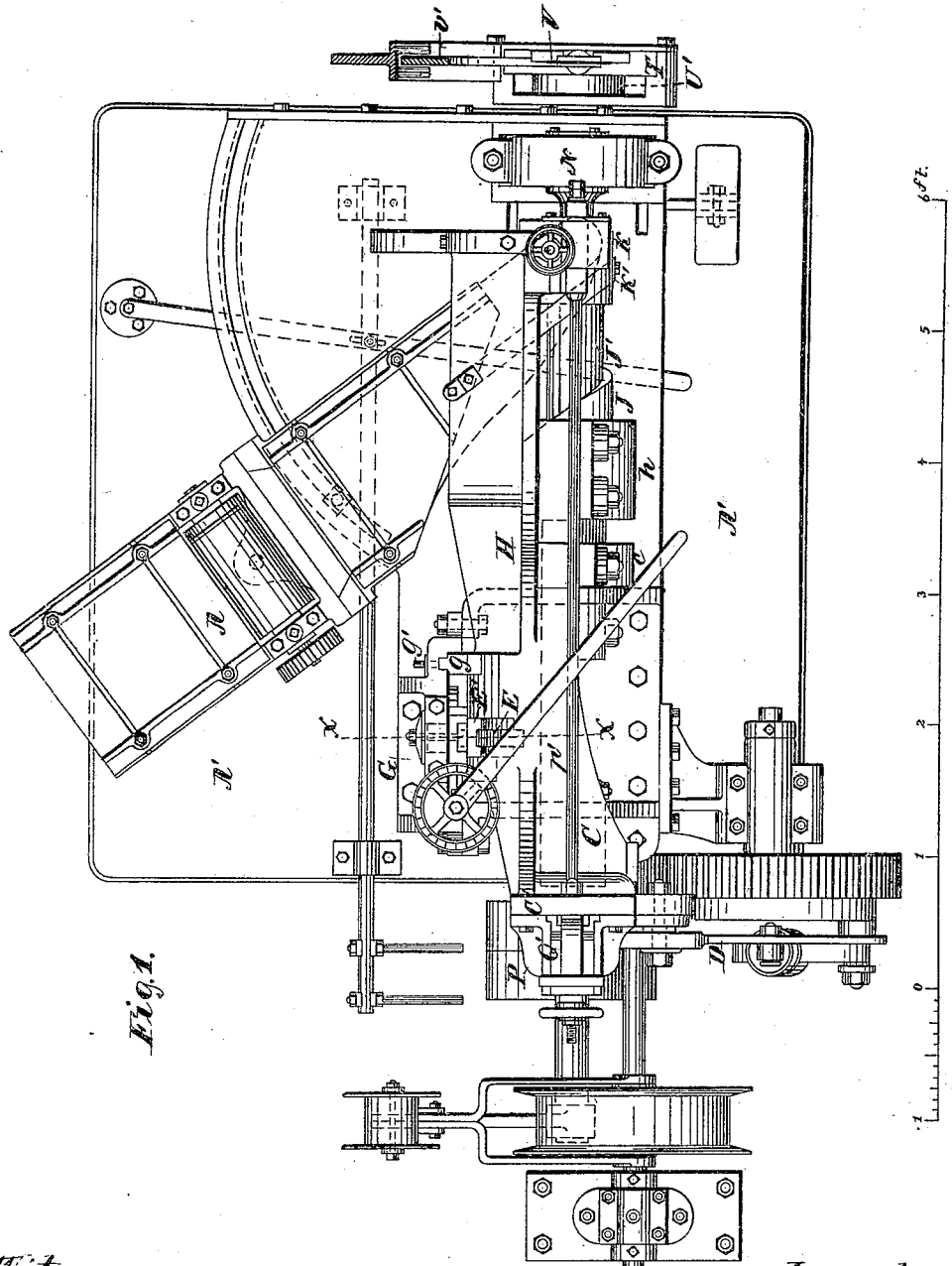

(No Model.)

7 Sheets—Sheet 1.

J. B. ROOT.
MACHINE FOR MAKING SPIRAL JOINTED METALLIC PIPE.

No. 271,740. Patented Feb. 6, 1883.

Witnesses:

Inventor:

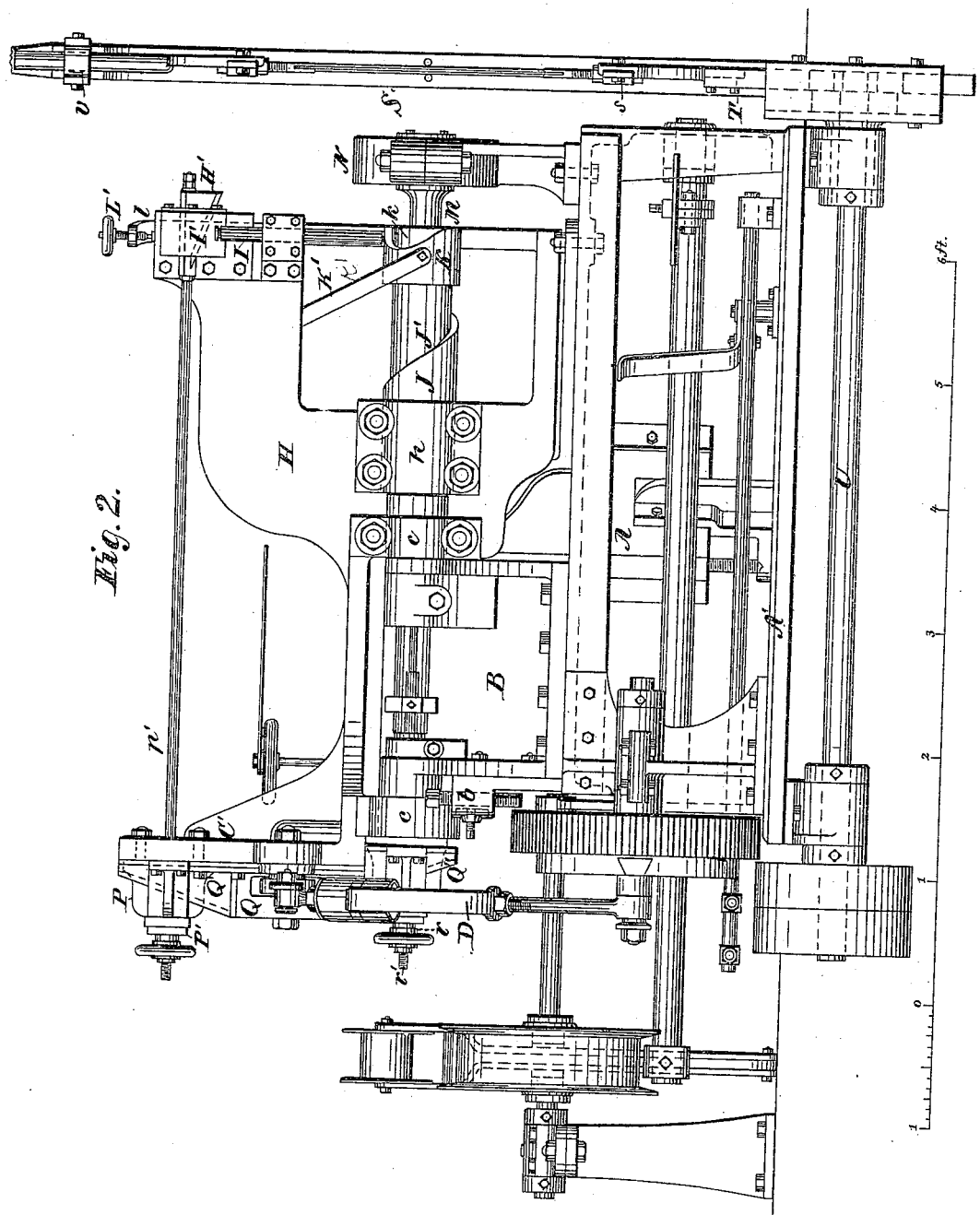

(No Model.)
7 Sheets—Sheet 3.
J. B. ROOT.
MACHINE FOR MAKING SPIRAL JOINTED METALLIC PIPE.
No. 271,740. Patented Feb. 6, 1883.
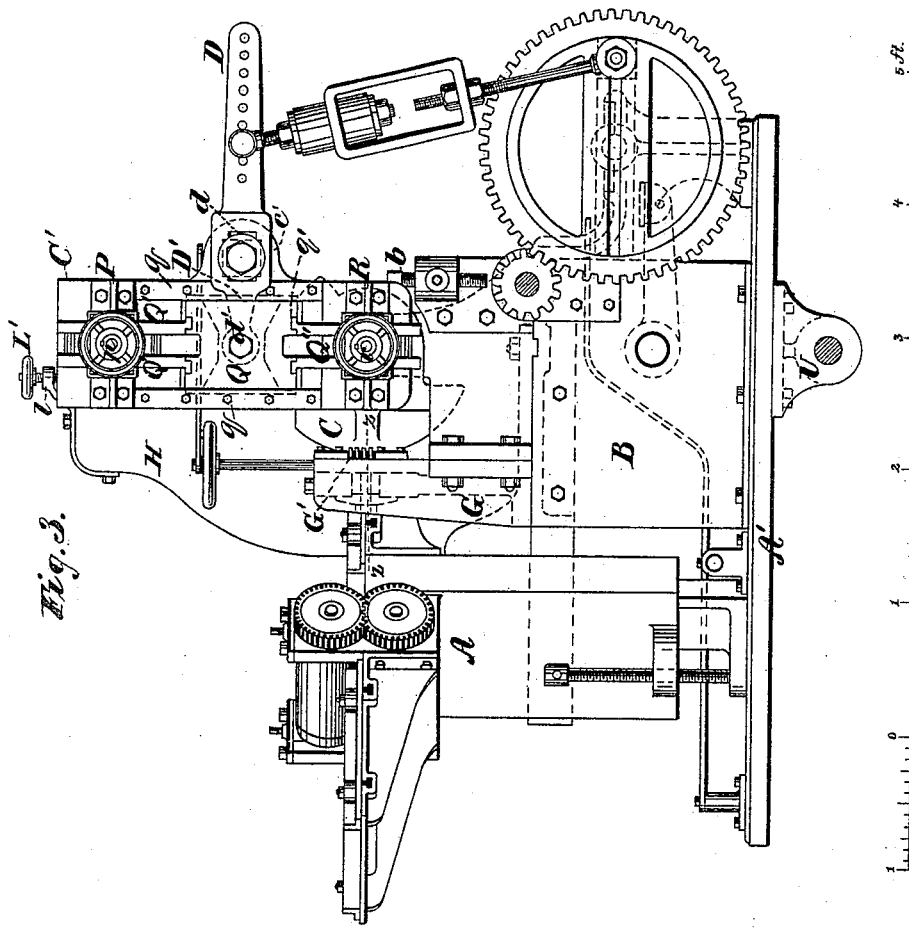
Witnesses:
Inventor:

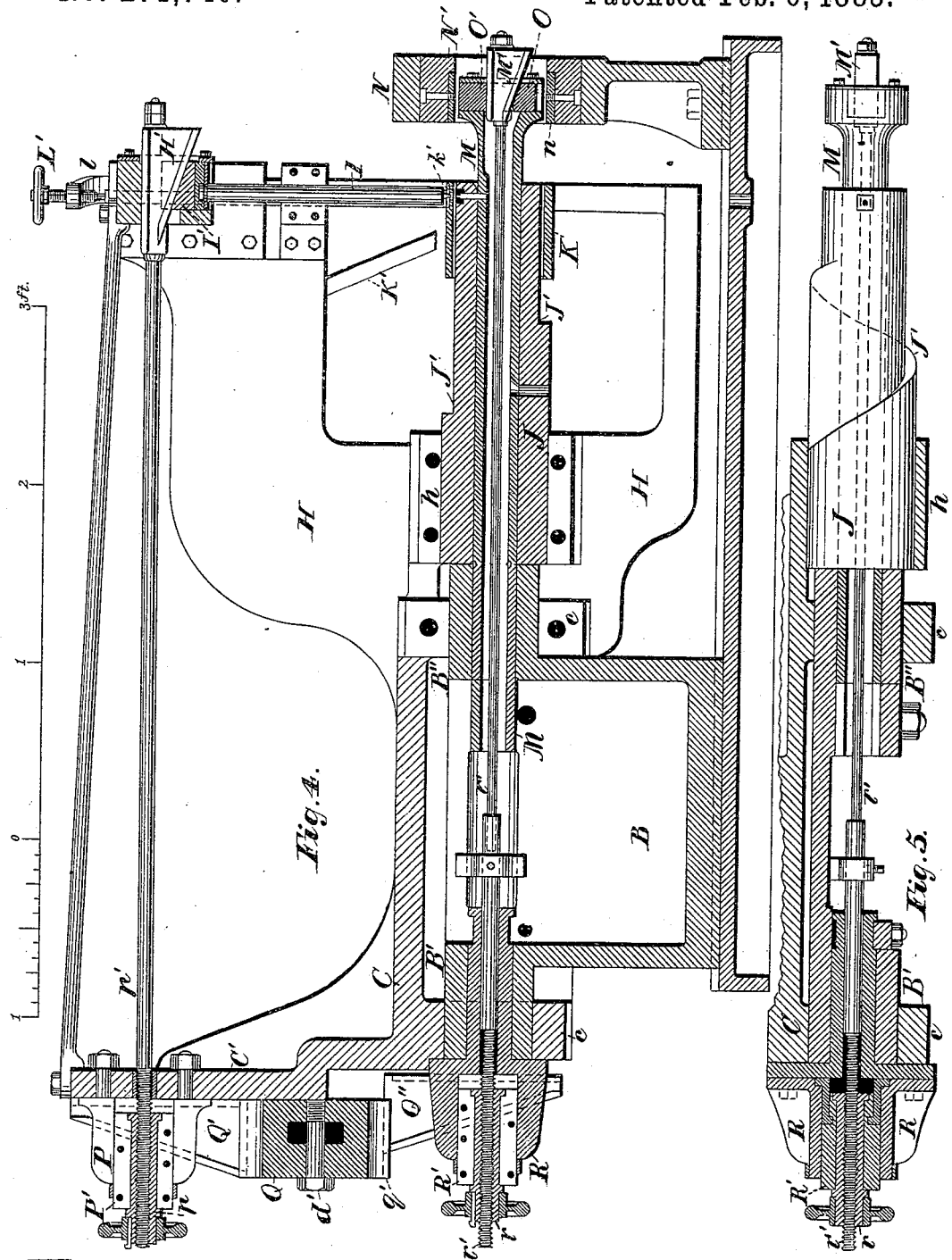

(No Model.) 7 Sheets—Sheet 5.
J. B. ROOT.
MACHINE FOR MAKING SPIRAL JOINTED METALLIC PIPE.
No. 271,740. Patented Feb. 6, 1883.
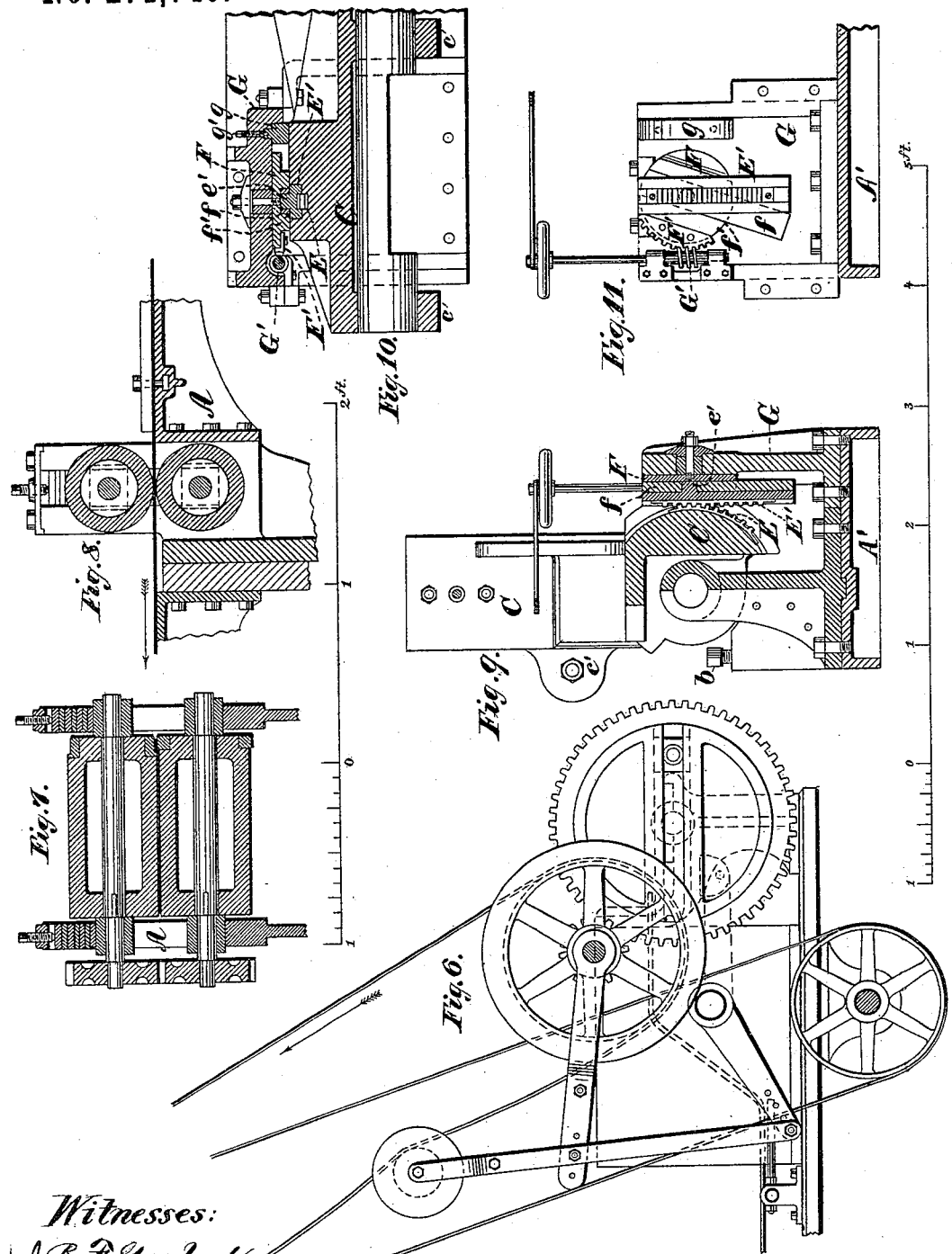
Witnesses:
J. R. D. Gaylord
Saml. A. Duncan
Inventor:
John B. Root

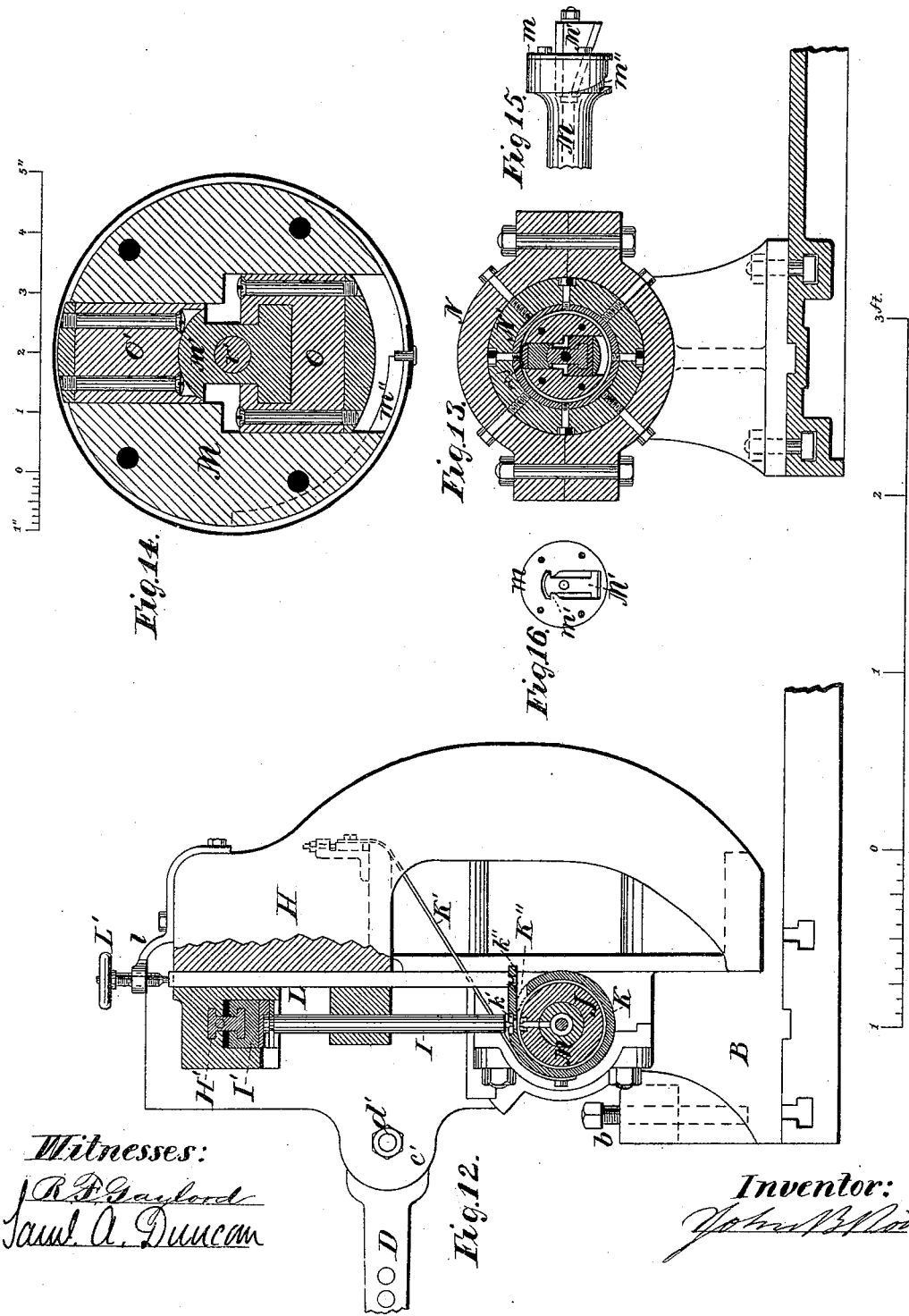

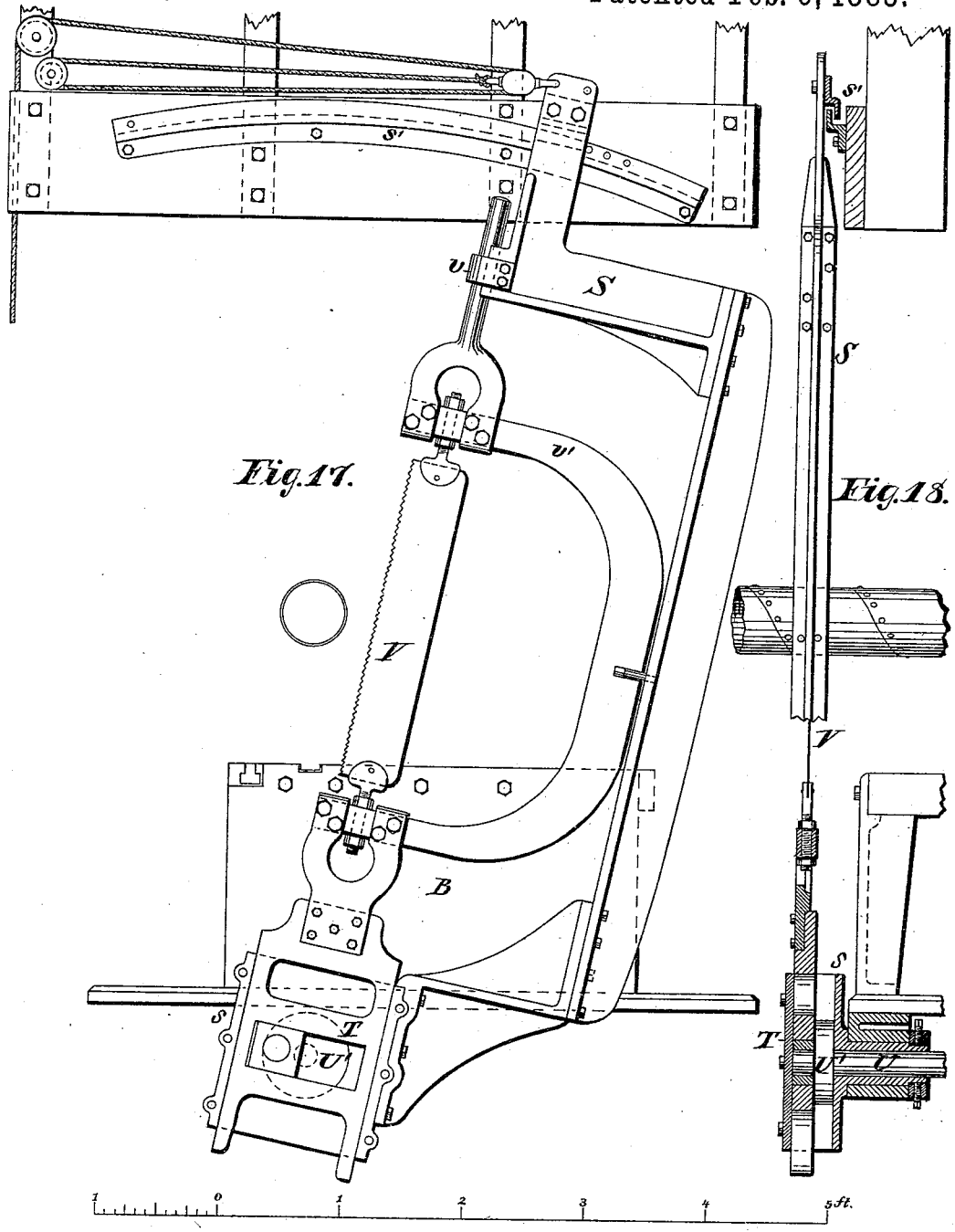

UNITED STATES PATENT OFFICE.

JOHN B. ROOT, OF PORT CHESTER, NEW YORK.

MACHINE FOR MAKING SPIRAL-JOINTED METALLIC PIPE.

SPECIFICATION forming part of Letters Patent No. 271,740, dated February 6, 1883.

Application filed April 22, 1882. (No model.)

*To all whom it may concern:*

Be it known that I, JOHN B. ROOT, of Port Chester, in the county of Westchester and State of New York, have invented certain new and useful Improvements pertaining to Machines for Making Spiral-Jointed Metallic Pipe or Tubing, of which the following is a specification.

The mechanism herein described as new consists of improvements in machines substantially the same as shown in Patent No. 183,329, issued to me October 17, 1876, which machines are chiefly composed of an adjustable roll-frame, a saddle mounted upon fixed bearings and arranged to receive simultaneously a circular and a longitudinal reciprocating-movement, a feeding and clamping mechanism, and a shaping device; and the essential features of the new mechanism which constitute the present invention are as follows: first, improved means for quickly altering the throw of the saddle; second, a wedge mechanism reciprocating with the saddle, and arranged to drive the punch and clamp the blank previous to and during such reciprocation, by which the blank is intermittingly fed forward to hold the blank clamped; third, a similar wedge mechanism adapted to impel a riveting-block, and by the same operation to grasp and retain the blank when released from the feed-motion; and, fourth, a cylindrical former, the office of which is to guide, shape, and assist in clamping and advancing the blank during the throw of the saddle.

In the accompanying drawings, Figure 1 is a plan view. Fig. 2 is an elevation. Fig. 3 is an end view from the left of Fig. 1. Fig. 4 is a vertical longitudinal section through the axis of the machine. Fig. 5 is a horizontal section through the mandrel-bearings, seen from above. Fig. 6 is an end elevation of the power-applying apparatus. Figs. 7 and 8 are vertical cross and longitudinal sections of the roll-frame. Fig. 9 is a vertical cross-section through the saddle-back, the rack operating thereon, and its supporting and regulating parts, observed from the right of plane *x x*, Fig. 1. Fig. 10 is a horizontal section of the parts illustrated by Fig. 9, viewed from above the plane *z z*, Fig. 3. Fig. 11 is a face view of the supporting and regulating parts shown by Fig. 9, the saddle being disengaged from the rack operating upon it. Fig. 12 is an elevation from the punch end of the machine, the mandrel and part of the saddle-frame being sectioned and broken away to expose contained and underlying parts. Fig. 13 is a cross-section of the anvil and head of the riveting-bar. Fig. 14 is a detail cross-section of the riveting-bar head through the riveting-block. Figs. 15 and 16 are respectively side and end views of the head of the riveting-bar. Fig. 17 is an elevation of the saw-frame, the saw in the position of rest; and Fig. 18 is an edge view of the parts shown by Fig. 17, the saw being swung to contact with the pipe and its block and frame partially sectioned and broken away.

Referring to the drawings in detail, A is the roll-frame, over which the blank passes on its way to the machine. It is attached to the bed-plate A' thereof, is angularly adjustable to the axis of the machine according to the width of the blank, and its rolls, shaped to give requisite form to the edges and permitted to yield to the irregularities of the blank, are vertically adjustable to admit of an even feed to the various sizes of mandrels.

B is the main standard or saddle-head, bearing trunnions B' B'', on which the saddle C reciprocates, being confined thereto by rings *c*, and limited in its circular movement by the adjustable stop-screw *b*, which circular movement is imparted to the saddle by the vibration of the driving-lever D, borne on the fulcrum-block *d*, pivoted to the wing *c'* of the upright C', projecting from the saddle.

E is a transverse circular gear formed in a groove on the back of the saddle, with which meshes the tangential rack E'. A trunnion, *e'*, on the back of this rack affords a bearing for the rocking slide *f*, moving in a groove, *f'*, in the face of the adjustable disk F, which is pivoted to the standard G, rising from the saddle-head. This disk bears a segmental gear, F', meshing with the worm G', turning which, it will be seen, alters the angle of the slide, and hence the longitudinal throw of the saddle, as it receives a circular movement on its axis. The extent of this movement is governed by the obliquity of the slide *f* to the axis of the saddle, and the angle between these parts can, through the worm G and its ratchet-lever, be quickly modified according to the requirements of the work and during the operation of the machine or a single throw of the saddle, such modification becoming necessary when irregularities and cross-locks occur in the blank to prevent straining to the machine. Standard G has gibbed to its inner side a friction-block, g, provided with set-screws g', which friction-block bears upon the back of the saddle to hold it stationary, at either limit of its throw, while the punching and riveting devices are operated.

Integral with the saddle is the frame H, carrying the punch I, which is operated by the longitudinal movement of the punching and clamping wedge H', which is flanged on the edges of its upper horizontal face to retain a fixed vertical position with reference to the punch and on the edges of its lower inclined face, upon which rides the punch-head I', confined to a vertical movement, to withdraw the punch at suitable intervals from punching and clamping the blank. The frame H also carries, supported at one end in bearings h, the hollow winding and punching mandrel J, the surface of which is formed into a spiral guide, J', to give direction to the incoming blank.

Encircling the mandrel just under the punch is the cylindrical former K, held in position by a metallic strap, K', sufficiently flexible to yield to irregularities and laps in the blank, which former is slotted at K'' for the introduction of the blank, grooved at k for the insertion of the rivets in the holes punched in the blank, and has a shouldered socket, k', to receive the end of the punch and through which the punch-point can act upon the blank. A stanchion, L, bears loosely in the lip k'' on the former to further support it, and is rendered adjustable and yielding by the screw L' and its spring-support l. This former, with the mandrel and the punching mechanism, constitutes the punching and clamping device when riveted pipe is made, or the seam-closing and clamping mechanism when welded or locked pipe is being formed.

From a fixed bearing within trunnion B'' of the saddle-head and through the winding and punching mandrel J projects the hollow riveting-bar M to within the anvil N, and at this outer end contains a riveting-wedge, M', upon the under inclined face and flanged edges of which rides the vertically-acting riveting-block O. The upper surface or face of this wedge bears against the vertically-acting pressure-block O', and the flanged edges thereof ride upon the ledges m' of the end plate, m, of the head of the riveting-bar, to insure the prompt return of the riveting-block after its downward thrust, and admit the delivery of the unriveted blank upon the anvil without drag of the rivets against such block. A groove, m'', in the surface of the riveting-head, of the same incline as the seam of the pipe, offers an unobstructed passage for the bodies of the rivets, and allows the riveting-head to practically fill the pipe.

The anvil N, supported from the base A' and independent of the rest of the machine, is circular in form and contains an inner removable annulus, N', lined with a steel face, n. This anvil, together with the contained riveting-block and its actuating wedge, constitutes the riveting device when riveted pipe is made; but when welded or lock-seamed pipe is made they serve to give final shape to the pipe and complete the welding or setting down of the seam.

Bolted to the upright C' is the bolster P, embracing a longitudinally-moving guide-block, P', which contains a sleeve, p, turning upon a threaded rod, p', and adjustably connecting the punching and clamping wedge with this guide-block. Through this bolster and on the face of the upright as a seat operate the leaves Q' of the vertically-reciprocating wedge-block Q, which are flanged on their perpendicular edges to engage with the bolster and hold the wedge-block in position on the upright C', and on their inclined edges to engage with the guide-block, that it may receive longitudinal motion to drive and retract, through the medium of rod p', the wedge of the punching and feeding mechanism. The wedge-block Q is further secured to its seat by appropriate ways q, and receives its actuating impulse from the secondary arm D' of the driving-lever D, which is bolted thereto by the rock-pin d', and has a lengthwise movement on its fulcrum-block d to accommodate its circular motion to the linear motion of the wedge-block.

R is a second bolster; R', guide-block; r, sleeve; Q'', wedge-leaves, and r', threaded connecting-rod to drive the riveting-wedge M', in every respect like that described to drive the punch, except that the bolster R has no endwise movement, but has a rocking motion in trunnion B' of the saddle-head, and the lower wedge-leaves, Q'', are attached to the wedge-block by dovetail or grooved connections q', which are parallel to the axis of the saddle, and allow the wedge-block to slide upon the heads of these leaves as the saddle goes forward, as they, being confined in the bolster R, can partake of its circular movement only.

Just beyond the anvil N is the upright radially-swinging saw-frame S, supported in bearings s at the lower end thereof, and on the track s' at its top. In suitable ways on the lower part of this frame the saw-block T plays, receiving its motion from the eccentric U' on the shaft U, under the bed of the machine, to drive the saw V, the bow V' of which is connected to the saw-block T and to the frame S by a slide-bearing, v.

The blank having been inserted and sufficiently advanced to receive the action of the riveting-block, the operation of the machine is as follows: The blank, of suitable width and thickness, passes through the rolls of and over the roll-frame, and is directed thereby and by the spiral mandrel-guide through the slotted opening in the former upon the punching and clamping-mandrel, one edge thereof coming just under the punch. Power being applied, the driving-lever vibrates downward, and, by the shorter swing of its secondary arm, moves up the wedge block, longitudinally impelling the upper guide-block with the connected punching and clamping wedge. This drives the punch into the punch-socket in the former, the punch-point through the blank, and forces the former down snugly upon the blank, clamping and spirally forming it by the conjoint action of the former and mandrel. The accomplishment of this action terminates the swing of the secondary arm of the driving-lever and completes the clamping act, so that the further vibration of the driving-lever imparts a circular motion to the saddle, coincident with which motion the longitudinal throw of the saddle is effected through the combined functions of the gear on the back of the saddle, the rack meshing therewith and the slide angularly set to the axis of the saddle, thus throwing the saddle lengthwise on its axis and disposing the blank spirally around the mandrel. During this throw the lower bolster has received a corresponding, partial revolution, but no motion horizontally, compensated for by the wedge-block having had such movement on the heads of the lower wedge-leaves. The saddle is now held stationary by the friction-block on its back, while the driving-lever commences its return vibration, and by the downward descent of the wedge-block withdraws the punch from the blank and releases the pressure upon the former. This reflex movement also impels longitudinally the guide-block in the lower bolster, and with it the riveting-wedge, whereby the pressure and riveting blocks are actuated—the former to impinge against the blank, finally shaping it under the reactive strain of the latter, while heading down the rivets at this period of the progress of the blank resting on the face of the anvil, having been inserted in the blank during its transit from the punch. Effecting this riveting action defines the downward movement of the wedge-block, and the continued vibration of the driving-lever in the return direction retrogrades the saddle to its normal position, pending which the blank has been retained in its advanced position by the united action of the anvil with the riveting and pressure blocks remaining at the position of impact. Again, the friction-block momentarily detains the saddle, the driving-lever revibrates, retracting the riveting and pressure blocks before the advance of the blank, the punch is driven, a new portion of the blank is clamped, and the throw of the saddle repeated. When the finished pipe has assumed such length as is desired the saw-frame is swung forward, with the saw in motion, and the pipe severed, this being the preferable means for such purpose.

To produce pipes of different sizes—larger, for example, than illustrated by the drawings—the winding and punching mandrel is removed from its bearings on the reciprocating frame of the saddle, with which the riveting-bar is displaced from its bearing in the trunnion of the saddle-head, and another mandrel and riveting-bar of larger diameters are substituted, the various sizes of both mandrel and riveting-bar being uniform as to their tenons. A shorter punch is inserted in the punch-head, a larger former put in place with shortened supports, the annular anvil being exchanged for one corresponding to the mandrel to be used, and the roll-frame, with its rolls, is readjusted at a greater angle to the mandrel, at a higher delivery-point, and for a greater width of blank.

This machine, although described for the manufacture of riveted pipe, is readily available for the construction of welded or seam-locked pipe upon slight modifications—such as the proper arrangement of the feed-rolls to give the required form to the edge of the blank, the omission of the punch-point, when the punch, with the former and mandrel, would act to close the seam, and such other change as would be apparent to one skilled in the art.

What is claimed as new is—

1. The combination, in a spiral-pipe-forming machine, of a rocking saddle and reciprocating wedges connected therewith and arranged to drive a reciprocating punch or seam-closing device.

2. The combination, in a pipe-machine, of a spirally-reciprocating saddle bearing a punching mechanism, and a riveting mechanism consisting of a wedge, a riveting-block, and an anvil, substantially as described.

3. The combination, in a spiral-pipe machine, of a rocking saddle, a reciprocating wedge borne thereon, a riveting mechanism, a wedge for operating the same, and mechanism connecting said wedge with the wedge of the saddle, substantially as described.

4. The combination, in a pipe-machine, of a punching mechanism borne on a reciprocating saddle, a riveting mechanism, and a double wedge arranged to operate said punching and riveting mechanisms, substantially as and for the purpose set forth.

5. The combination, in a pipe-machine, of a punching mechanism borne on a reciprocating saddle, a riveting mechanism, and a double wedge for operating such punching and riveting mechanisms, so connected to the saddle that one of its parts is caused to partake of the longitudinal motion of the saddle and both of its parts to partake of the circular motion thereof, substantially as and for the purpose set forth.

6. The combination, in a spiral-pipe machine, of a winding-mandrel, a cylindrical former surrounding the mandrel, and a punch operating with such former, substantially as and for the purpose set forth.

7. In combination with the mandrel of a spiral-pipe machine, a cylindrical former surrounding the mandrel, and flexible supports arranged to hold such former in position, substantially as set forth.

8. The combination, in a spiral-pipe-forming machine, of a rocking saddle provided with a transverse circular gear, a rack meshing with such gear, and a guiding-slide pivotally connected to said rack and moving in a groove in the face of a disk, and receiving angular adjustment to the axis of the saddle by means of a screw tangent to such disk, whereby the longitudinal throw of the saddle is effected as it receives a circular motion, substantially as set forth.

9. The combination, in a pipe-machine, of a cylindrical spirally-reciprocating clamping and shaping mandrel, a riveting-bar provided with a longitudinally-reciprocating wedge and a riveting-block, and a circular anvil, substantially as set forth.

JOHN B. ROOT.

Witnesses:
   JAMES S. GREVES,
   R. F. GAYLORD.